US009027694B2

(12) United States Patent  (10) Patent No.: US 9,027,694 B2
Matsuda  (45) Date of Patent: May 12, 2015

(54) SADDLE-TYPE ELECTRIC VEHICLE (75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/988,317

(22) PCT Filed: Nov. 18, 2010

(86) PCT No.: PCT/JP2010/006766
§ 371 (c)(1),
(2), (4) Date: Jun. 19, 2013

(87) PCT Pub. No.: WO2012/066601
PCT Pub. Date: May 24, 2012

(65) Prior Publication Data
US 2013/0256049 A1 Oct. 3, 2013

(51) Int. Cl.
*B62K 11/04* (2006.01)
*B62K 11/00* (2006.01)
*B62K 11/06* (2006.01)
*B62M 7/04* (2006.01)

(52) U.S. Cl.
CPC ............... *B62K 11/00* (2013.01); *B62K 11/06* (2013.01); *B62K 2204/00* (2013.01); *B62K 2208/00* (2013.01); *B62M 7/04* (2013.01); *B62K 11/04* (2013.01)

(58) Field of Classification Search
CPC ........ B62K 11/00; B62K 11/04; B62K 11/06; B62K 2208/00; B62M 7/04
USPC ............... 180/220, 229, 68.5, 68.3, 68.2, 219
See application file for complete search history.

(56) References Cited

U.S. PATENT DOCUMENTS

| 4,637,486 | A  | * | 1/1987 | Iwai .............................. 180/225 |
| 5,501,292 | A  | * | 3/1996 | Kawashima et al. ......... 180/220 |
| 5,577,747 | A  | * | 11/1996 | Ogawa et al. ................. 180/220 |
| 6,247,548 | B1 | * | 6/2001 | Hayashi et al. ............ 180/206.2 |
| 7,210,550 | B2 | * | 5/2007 | Yonehana et al. ............ 180/220 |
| 7,255,188 | B2 | * | 8/2007 | Tsukada et al. ............ 180/65.51 |
| 7,261,172 | B2 | * | 8/2007 | Tsukada et al. .............. 180/68.1 |
| 7,607,501 | B2 | * | 10/2009 | Smith et al. .................. 180/68.1 |
| 7,798,269 | B2 | * | 9/2010 | Makuta et al. ............... 180/68.5 |
| 8,167,070 | B2 | * | 5/2012 | Takamura et al. ........... 180/68.5 |

(Continued)

FOREIGN PATENT DOCUMENTS

| JP | 62185153 U | 11/1987 |
| JP | 05105178 A | 4/1993 |

(Continued)

OTHER PUBLICATIONS

ISA Japan, International Search Report of PCT/JP2010/006766, Feb. 16, 2011, WIPO, 2 pages.

*Primary Examiner* — Kevin Hurley
*Assistant Examiner* — Gabriela C Craciun
(74) *Attorney, Agent, or Firm* — Alleman Hall McCoy Russell & Tuttle LLP (57) ABSTRACT An electric two-wheeled vehicle includes a motor generating traveling power transmitted to a rear wheel, and a motor case accommodating the motor, wherein the motor case has a traveling wind inflow port allowing traveling wind to flow in the motor case, and a traveling wind outflow port allowing traveling wind flowing in the motor case to flow out, and a space surrounded by the motor case is communicated with a space where a coil of the motor is arranged.

17 Claims, 7 Drawing Sheets

(56) References Cited

U.S. PATENT DOCUMENTS

| | | |
|---|---|---|
| 8,485,300 B2 * | 7/2013 | Hasegawa et al. ............. 180/220 |
| 8,490,732 B2 * | 7/2013 | Sugimoto et al. ........... 180/206.1 |
| 8,505,668 B2 * | 8/2013 | Iwakami et al. .............. 180/220 |
| 2006/0060400 A1 * | 3/2006 | Iwashita et al. .............. 180/65.3 |
| 2008/0093148 A1 * | 4/2008 | Takahashi ..................... 180/220 |
| 2008/0289893 A1 * | 11/2008 | Iwanaga ....................... 180/229 |
| 2010/0078248 A1 * | 4/2010 | Kanno et al. .................. 180/220 |
| 2010/0078251 A1 * | 4/2010 | Nishiura et al. ............... 180/229 |
| 2010/0163326 A1 * | 7/2010 | Takamura et al. ............ 180/68.5 |
| 2011/0139531 A1 * | 6/2011 | Kanno et al. .................. 180/220 |
| 2011/0240392 A1 * | 10/2011 | Iwata et al. ................... 180/229 |
| 2012/0111651 A1 * | 5/2012 | Irie et al. ...................... 180/65.1 |
| 2013/0081895 A1 * | 4/2013 | Nomura et al. ............... 180/220 |

FOREIGN PATENT DOCUMENTS

| | | |
|---|---|---|
| JP | 06247374 A | 9/1994 |
| JP | 07117765 A | 5/1995 |
| JP | 10095378 A | 4/1998 |
| JP | 10297570 A | 11/1998 |
| JP | 2001106162 A | 4/2001 |
| JP | 2006076496 A | 3/2006 |
| JP | 2008195245 A | 8/2008 |
| JP | 2010083372 A | 4/2010 |
| JP | 2010228660 A | 10/2010 |

* cited by examiner

SADDLE-TYPE ELECTRIC VEHICLE

TECHNICAL FIELD

The present invention relates to a saddle-type electric vehicle such as an electric two-wheeled vehicle generating traveling power by a motor.

BACKGROUND ART

Recently, electric vehicles employing motors driven by electric energy accommodated in batteries as traveling power sources have been developed for the purpose of environmental protection. In such vehicles, a configuration of arranging a motor case to be exposed outside and cooling a motor, or a configuration of cooling a motor by air introduced by a cooling fan is proposed (e.g., see Patent Document 1).

PRIOR ART DOCUMENT

Patent Document

Patent Document 1: Japanese Patent Application Laid-open No. H05-105178

SUMMARY OF THE INVENTION

Problems to be Solved by the Invention

However, exposure of the motor case outside may not achieve sufficient cooling performance when output of the motor increases and the motor is overheated. In a case of a configuration where the motor is cooled by the cooling fan, the number of components increases and power for driving the cooling fan is needed.

An object of the present invention is to enable effective cooling of the motor with a simple configuration.

Solutions to the Problems

In order to solve the aforementioned problems, a saddle-type electric vehicle according to the present invention includes a motor generating traveling power transmitted to a drive wheel, and a motor case accommodating the motor, wherein the motor case has a traveling wind inflow port allowing traveling wind to flow in the motor case, and a traveling wind outflow port allowing traveling wind flowing in the motor case to flow out, and a space surrounded by the motor case is communicated with a space where a coil of the motor is arranged.

According to the aforementioned configuration, traveling wind flows in the motor case from the traveling wind inflow port during vehicle traveling, enters the space where the coil of the motor is arranged, and flows out of the motor case from the traveling wind outflow port, and hence the coil of the motor or the like can be directly cooled without a cooling fan or the like. Accordingly, the motor can be effectively cooled while having a simple configuration. Moreover, when output of the motor increases, vehicle speed increases and a flow rate of traveling wind increases, and hence cooling performance is naturally enhanced as the output of the motor increases and a heat value increases. Accordingly, just enough cooling can be achieved with no special device.

The saddle-type electric vehicle may include a battery supplying electric power to the motor, and a battery case accommodating the battery, wherein the battery case may have a traveling wind inflow port allowing traveling wind to flow in the battery case, and a traveling wind outflow port allowing traveling wind flowing in the battery case to flow out, the battery case may be arranged in front of the motor case, and the traveling wind outflow port of the battery case may be communicated with the traveling wind inflow port of the motor case.

According to the aforementioned configuration, traveling wind during vehicle traveling first flows in the battery case to cool the batteries, and traveling wind exchanging heat with the batteries flows in the motor case to cool the motor, and hence the batteries can be sufficiently cooled compared to the motor, while forming a continuous traveling wind path.

The saddle-type electric vehicle may include a valve provided on a traveling wind path including the traveling wind inflow port and the traveling wind outflow port, a valve actuator driving the valve, a detector for detecting a parameter value associated with output of the motor, and a controller controlling the valve actuator according to the parameter value detected by the detector.

According to the aforementioned configuration, a flow amount of the traveling wind flowing inside the motor case is controlled according to the output of the motor by controlling the valve opening degree according to the parameter value associated with the output of the motor, and therefore the motor can be suitably cooled according to an operating status, and a temperature can be previously suitably kept before excessively increasing.

The detector may be at least one of a current sensor detecting a value of a current flowing through the coil of the motor, a vehicle speed sensor detecting vehicle traveling speed, an accelerator operation-amount sensor detecting an accelerator operation-amount by a driver, a battery voltage sensor and a battery inside temperature sensor.

According to the aforementioned configuration, a cooling degree of the motor can be easily controlled according to the output of the motor while having a simple configuration.

In a case where the parameter value is such a value that output of the motor increases, the controller may control the valve actuator such that an opening degree of the valve becomes larger compared to a case where the parameter value is such a value that the output of the motor reduces.

According to the aforementioned configuration, when the output of the motor increases and the heat value of the motor increases, the opening degree of the valve increases and the flow rate of the traveling wind flowing in the motor case increases, and hence the motor can be sufficiently cooled when the heat value is large.

In a case where the parameter value is such a value that output of the motor increases, the controller may control the valve actuator such that an opening degree of the valve becomes smaller compared to a case where the parameter value is such a value that the output of the motor reduces.

According to the aforementioned configuration, when the output of the motor increases and the traveling speed increases, increase of the flow rate of the traveling wind flowing in the motor case is suppressed, and hence excessive cooling by traveling wind can be prevented.

The saddle-type electric vehicle may be a motorcycle, and include a body frame having a head pipe supporting a steering shaft, and a frame portion extending substantially rearward from the head pipe, and the motor case and the battery case may form a part of the frame portion, the battery case may extend such that a rear portion is located at a lower position, and a rear end portion of the battery case may be connected to a front end portion of the motor case.

According to the aforementioned configuration, the motor case and the battery case configures a part of the body frame, and the battery case functions like a conventional main frame, and hence an increase in size of a whole vehicle can be suppressed compared to a case where the body frame supports the motor case and the battery case.

The traveling wind path including the traveling wind inflow port and the traveling wind outflow port may include a filter provided on the traveling wind inflow port or an upstream region with respect to the traveling wind inflow port.

According to the aforementioned configuration, traveling wind purified by the filter flows in the motor case, and mixing of foreign matters in the motor can be prevented.

The traveling wind path including the traveling wind inflow port and the traveling wind outflow port may include a drain outlet provided on an upstream region with respect to the traveling wind inflow port, and allowing moisture attached to a wall surface forming the traveling wind path to be discharged outside by its own weight.

According to the aforementioned configuration, the moisture included in traveling wind in the rain is attached to the wall surface forming the traveling wind path, and discharged outside from the drain outlet, and therefore can be inhibited from flowing in the motor case.

A traveling wind outlet discharging traveling wind flowing through the traveling wind path including the traveling wind inflow port and the traveling wind outflow port to atmosphere may be arranged above the motor case and below a seat for seating.

According to the aforementioned configuration, the traveling wind outlet is arranged above the motor case and below the seat for seating, and hence rainwater or the like can be inhibited from entering the traveling wind path from the traveling wind outlet, or stagnant water on the ground can be inhibited from scattering to enter.

A labyrinth portion may be provided on the traveling wind outlet.

According to the aforementioned configuration, even when rainwater or the like reaches the traveling wind outlet, the labyrinth portion catches the rainwater or the like, and hence mixing of the rainwater or the like in the traveling wind path can be sufficiently suppressed.

In the traveling wind path including the traveling wind inflow port and the traveling wind outflow port, a traveling wind inlet taking in traveling wind from outside may be provided upstream with respect to the traveling wind inflow port, and an area of the traveling wind inflow port may be smaller than that of the traveling wind inlet.

According to the aforementioned configuration, the wind speed in the traveling wind inflow port is made larger than that in the traveling wind inlet, and the motor can be effectively cooled.

In the traveling wind path including the traveling wind inflow port and the traveling wind outflow port, a traveling wind inlet taking in traveling wind from outside may be provided upstream with respect to the traveling wind inflow port, and the traveling wind path may be provided with an auxiliary chamber partially expanding a flow path section between the traveling wind inflow port and the traveling wind inlet.

According to the aforementioned configuration, an area of a flow path section where the auxiliary chamber exists is larger than those of the traveling wind inlet and the traveling wind inflow port, and hence a flow rate of the air in the flow path section where the auxiliary chamber exists reduces once and the auxiliary chamber can trap rain or dust from outside.

EFFECTS OF THE INVENTION

As seen in the aforementioned description according to the present invention, just enough cooling for the motor can be achieved with a simple configuration without any special device.

EMBODIMENTS OF THE INVENTION

Hereinafter, embodiments according to the present invention will be described with reference to the drawings. A concept of a direction used in the following description is based on a direction viewed from a driver riding an electric two-wheeled vehicle. The present invention is applied to an electric two-wheeled vehicle in the present embodiment, but applicable to an ATV (All Terrain Vehicle) or the like in a case of a saddle-type electric vehicle traveling with power by a motor, driven while being straddled by a driver.

(First Embodiment)

Figure 1:
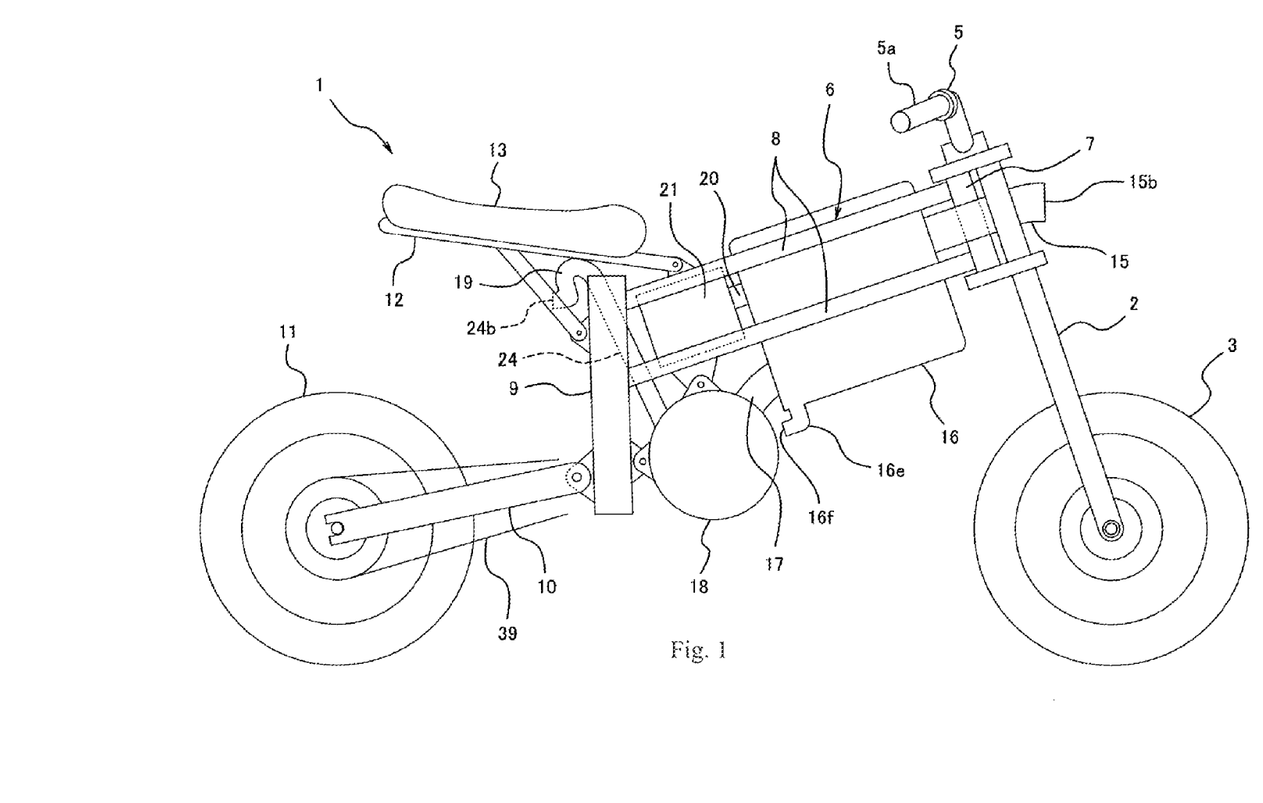
FIG. 1 is a right side view of an electric two-wheeled vehicle according to a first embodiment of the present invention.
Figure 2:
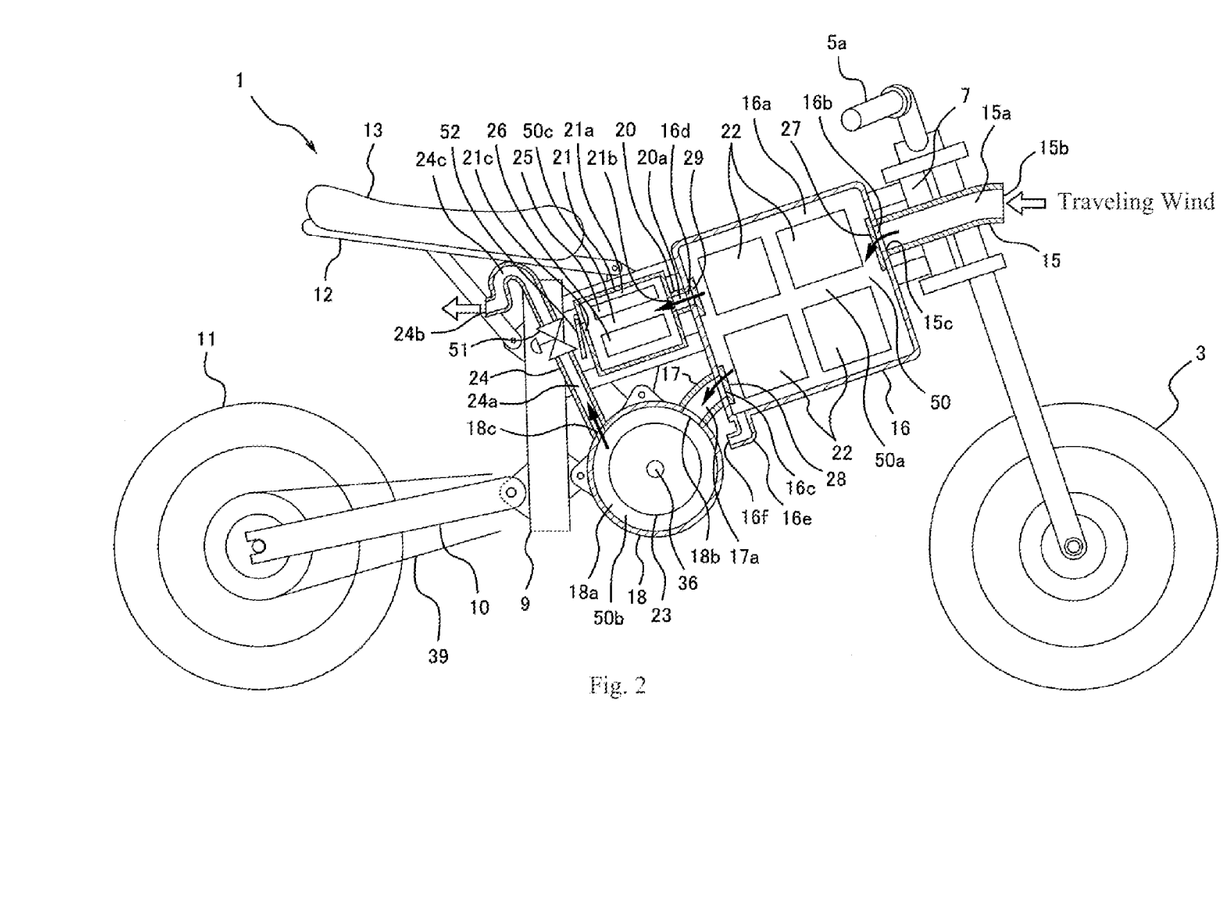
FIG. 2 is a right side view including a part of the electric two-wheeled vehicle shown in FIG. 1 in section.
Figure 3:
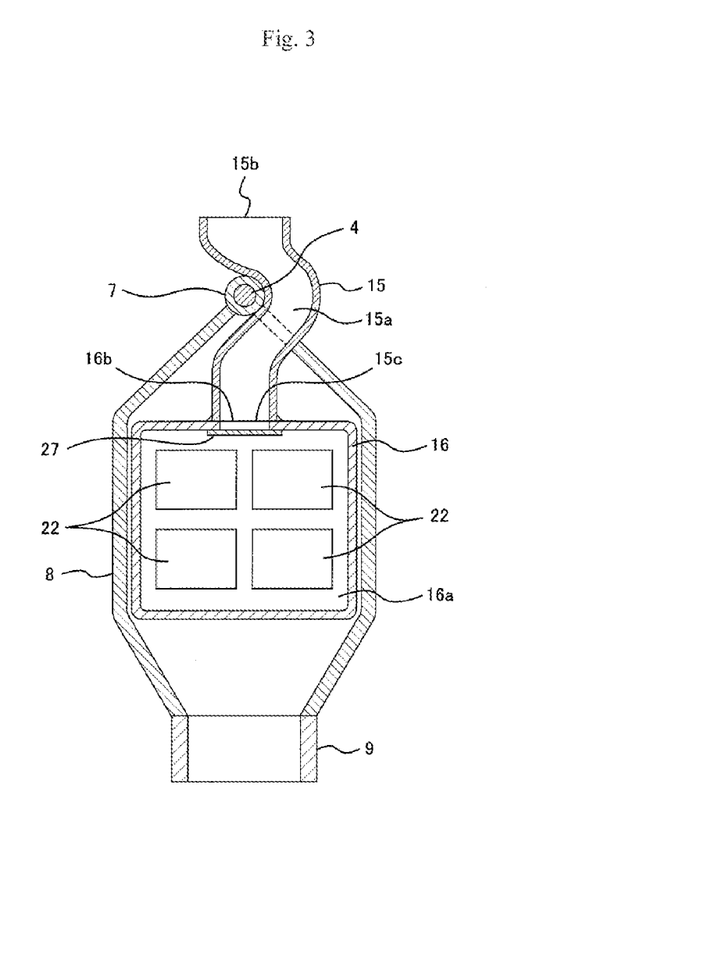
FIG. 3 is a sectional view as viewed from above a main portion of the electric two-wheeled vehicle shown in FIG. 1.

FIG. 1 is a right side view of an electric two-wheeled vehicle 1 according to a first embodiment of the present invention. FIG. 2 is a right side view including a part of the electric two-wheeled vehicle 1 shown in FIG. 1 in section. FIG. 3 is a sectional view as viewed from above a main portion of the electric two-wheeled vehicle 1 shown in FIG. 1. As shown in FIG. 1, the electric two-wheeled vehicle 1 includes no internal-combustion engine, and travels by rotating a rear wheel 11 with power from a motor 23. The electric two-wheeled vehicle 1 includes a front fork 2 provided substantially vertically at a predetermined caster angle, and a front wheel 3 as a driven wheel is rotatably supported on a lower portion of the front fork 2. A steering shaft 4 (see FIG. 3) has a lower portion connected to an upper portion of the front fork 2, and an upper portion mounted with a bar-type handle 5. In the handle 5, an accelerator grip 5a is provided on a portion gripped by a right hand of a driver. The steering shaft 4 is rotatably inserted into a head pipe 7 configuring a body frame 6, and the driver steers the front wheel 3 by rotating the handle 5.

The body frame 6 includes the head pipe 7, and a pair of right and left and a pair of upper and lower main frames 8 extending rearward while inclining downward from the head pipe 7. Rear portions of the main frames 8 are connected to a pair of right and left pivot frames 9. A front portion of a swing arm 10 extending in a substantially forward and rearward direction pivots on the pivot frames 9, and a rear wheel 11 as a drive wheel is rotatably supported on a rear portion of the swing arm 10. A seat frame 12 supporting a seat 13 for a driver's riding is connected to the main frames 8 and the pivot frames 9.

As shown in FIGS. 1 and 3, a battery case 16 accommodating a plurality of batteries 22 are arranged between the pair of right and left main frames 8, and this battery case 16 is fixed to the main frames 8. The battery case 16 has a substantially rectangular parallelepiped outline, and is arranged to overlap the main frames 8 in side view. More specifically, a center position of the battery case 16 is located slightly lower than a centerline extending forward and rearward of the main frames 8 in a state where the battery case 16 overlaps the main frames 8 in side view. Thus, the heavy batteries 22 can be arranged much lower, and the plurality of batteries 22 are arranged near the main frames 8 in a concentrative manner in side view, and therefore mechanical cornering performance is improved without diminishing straight-running stability of the electric two-wheeled vehicle 1. A motor case 18 accommodating the motor 23 for traveling power is arranged behind and below the battery case 16 and in front of the pivot frames 9, and this motor case 18 is fixed to the main frames 8 and the pivot frames 9. The motor case 18 has a substantially cylindrical outline, and accommodates the motor 23 such that an output shaft 36 of the motor 23 faces a vehicle width direction.

An electronic device case 21 accommodating a controller 25 and an inverter 26 is arranged behind the battery case 16, above the motor case 18, and in front of the pivot frames 9. The inverter 26 converts DC power accommodated in the batteries 22 to AC power to supply the same to the motor 23. The controller 25 instructs the inverter 26 to control power supplied from the batteries 22 to the motor 23, thereby controlling operation of the motor 23. The output shaft 36 (see FIG. 3) of the motor 23 is provided with a sprocket 38 (see FIG. 4), and rotative power is transmitted to the rear wheel 11 as a drive wheel by a chain 39 wound around a sprocket 38.

As shown in FIGS. 2 and 3, the electric two-wheeled vehicle 1 of the present embodiment is configured such that traveling wind passes inside the battery case 16, the motor case 18 and the electronic device case 21 during traveling. A first duct 15 taking in traveling wind from front is provided near the head pipe 7. The first duct 15 has a flow path 15a extending in a forward and rearward direction, and arranged to avoid the head pipe 7 in the middle of the flow path 15a. The head pipe 7 may airtightly penetrate the first duct vertically. A traveling wind inlet 15b opening forward is provided on a front end portion of the first duct 15, and is located in front of the head pipe 7. The traveling wind outflow port 15c on a rear end portion of the first duct 15 is communicated with a traveling wind inflow port 16b on a front portion of the battery case 16.

A filter 27 made of non-woven fabric and the like is arranged on the traveling wind inflow port 16b of the battery case 16 to catch foreign matters, rainwater or the like included in traveling wind flowing into an inner space 16a of the battery case 16 from the first duct 15. The plurality of batteries 22 are arranged with clearances therebetween in the inner space 16a of the battery case 16. A drain pipe 16e is connected to a lowermost portion in a gravity direction at a rear lower portion of the battery case 16, and moisture attached to a wall surface of the battery case 16 can be discharged outside from the drain outlet 16f of the drain pipe 16e by its own weight.

A first traveling wind outflow port 16c is provided on a rear lower side of the battery case 16, and arranged with a filter 28 made of non-woven fabric and the like. The first traveling wind outflow port 16c of the battery case 16 is communicated with a traveling wind inflow port 18b of the motor case 18 through the second duct 17. This traveling wind inflow port 18b is arranged to face an outer peripheral surface of the motor 23 accommodated in an inner space 18a of the motor case 18. Thus, traveling wind during vehicle traveling first flows in the battery case 16 to cool the batteries 22, and traveling wind exchanging heat with the batteries 22 flows in the motor case 18 to cool the motor 23, and hence the batteries 22 can be sufficiently cooled compared to the motor 23.

A traveling wind outflow port 18c is provided on a rear side with respect to the traveling wind inflow port 18b of the motor case 18. A third duct 24 is communicated with the traveling wind outflow port 18c. The third duct 24 extends diagonally rear upward, and a traveling wind outlet 24b on its downstream end portion is arranged above the motor case 18 and below the seat 13. Consequently, mixing of rainwater or the like inside the third duct 24 from the traveling wind outlet 24b is suppressed. Furthermore, in order to prevent mixing of rainwater or the like in an upstream side from the traveling wind outlet 24b, the traveling wind outlet 24b is provided with a labyrinth portion 24c configured by extending the third duct 24 upward to directly below the seat 13 and then bending the same downward. A first valve 51 is interposed in an intermediate portion of the third duct 24. This first valve 51 is provided to enable opening/closing of the flow path 24a of the third duct 24, and driven to enable adjustment of an opening degree by a first valve actuator 44 (see FIG. 5).

A second traveling wind outflow port 16d is provided on a rear upper side of the battery case 16, and arranged with a filter 29 made of non-woven fabric and the like. The second traveling wind outflow port 16d of the battery case 16 is communicated with a traveling wind inflow port 21b of the electronic device case 21 through the fourth duct 20. A traveling wind outflow port 21c is provided on a rear portion of the electronic device case 21. A second valve 52 is interposed in the traveling wind outflow port 21c. This second valve 52 is provided to enable opening/closing of the traveling wind outflow port 21c, and driven to enable adjustment of an opening degree by a second valve actuator 45 (see FIG. 5).

A traveling wind path 50 of the electric two-wheeled vehicle 1 is configured from the flow path 15a of the first duct 15, the inner space 16a of the battery case 16, a flow path 17a of the second duct 17, the inner space 18a of the motor case 18, the flow path 24a of the third duct 24, a flow path 20a of the fourth duct 20, and an inner space 21a of the electronic device case 21. Specifically, the flow path 15a of the first duct 15 and the inner space 16a of the battery case 16 are a common path 50a, the flow path 17a of the second duct 17, the inner space 18a of the motor case 18, and the flow path 24a of the third duct 24 are a first branch path 50b, and the flow path 20a of the fourth duct 20 and the inner space 21a of the electronic device case 21 are a second branch path 50c. The traveling wind path 50 is symmetrically provided with respect to a centerline extending in the forward and rearward direction in plan view. The respective inflow ports 16b, 18b, 21b on a downward stream with respect to the traveling wind inlet 15b in the traveling wind path 50 are preferably smaller openings than the traveling wind inlet 15b, thereby enabling wind speed to increase near the respective inflow ports, and enabling cooling effects to be enhanced.

Figure 4:
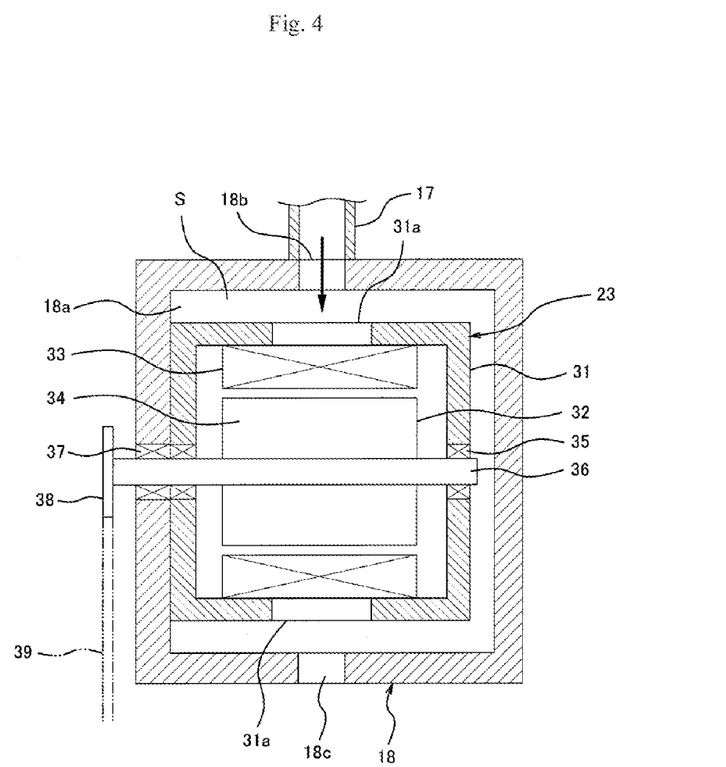
FIG. 4 is a sectional view as viewed from above a motor of the electric two-wheeled vehicle shown in FIG. 1 and a vicinity thereof.

FIG. 4 is a sectional view as viewed from above the motor 23 of the electric two-wheeled vehicle 1 shown in FIG. 1 and a vicinity thereof. As shown in FIG. 4, the motor 23 is arranged with a clearance S from an inner peripheral surface of the motor case 18 in the inner space 18a of the motor case 18. The motor 23 includes a stator 31 arranged on an outer peripheral side, and a rotor 32 provided on an inner peripheral side. The stator 31 is provided with a coil 33 electrically connected to the inverter 26, and the rotor 32 is provided with a permanent magnet 34. The output shaft 36 penetrates the rotor 32 in a vehicle width direction, and is rotatably supported by the stator 31 and the motor case 18 through bearings 35, 37. One end portion of the output shaft 36 protrudes outside the motor case 18, and is provided with a sprocket 38. The chain 39 driving the rear wheel 11 is wound around the sprocket 38.

A plurality of communication holes 31a communicating the clearance S and inside of the motor 24 at a peripheral interval are formed on an outer peripheral wall of the stator 31. Consequently, traveling wind flowing into the motor case 18 from the traveling wind inflow port 18b during vehicle traveling directly cools the coil 33 and the like, and flows outside the motor case 18 from the traveling wind outflow port 18c. Accordingly, the motor 23 is effectively cooled while having a simple configuration with no cooling fan and the like. Moreover, when output of the motor 23 increases, vehicle speed increases and a flow rate of traveling wind increases, and hence cooling performance is naturally enhanced as the output of the motor 23 increases and a heat value increases. Accordingly, just enough cooling can be achieved with no special device.

Figure 5:
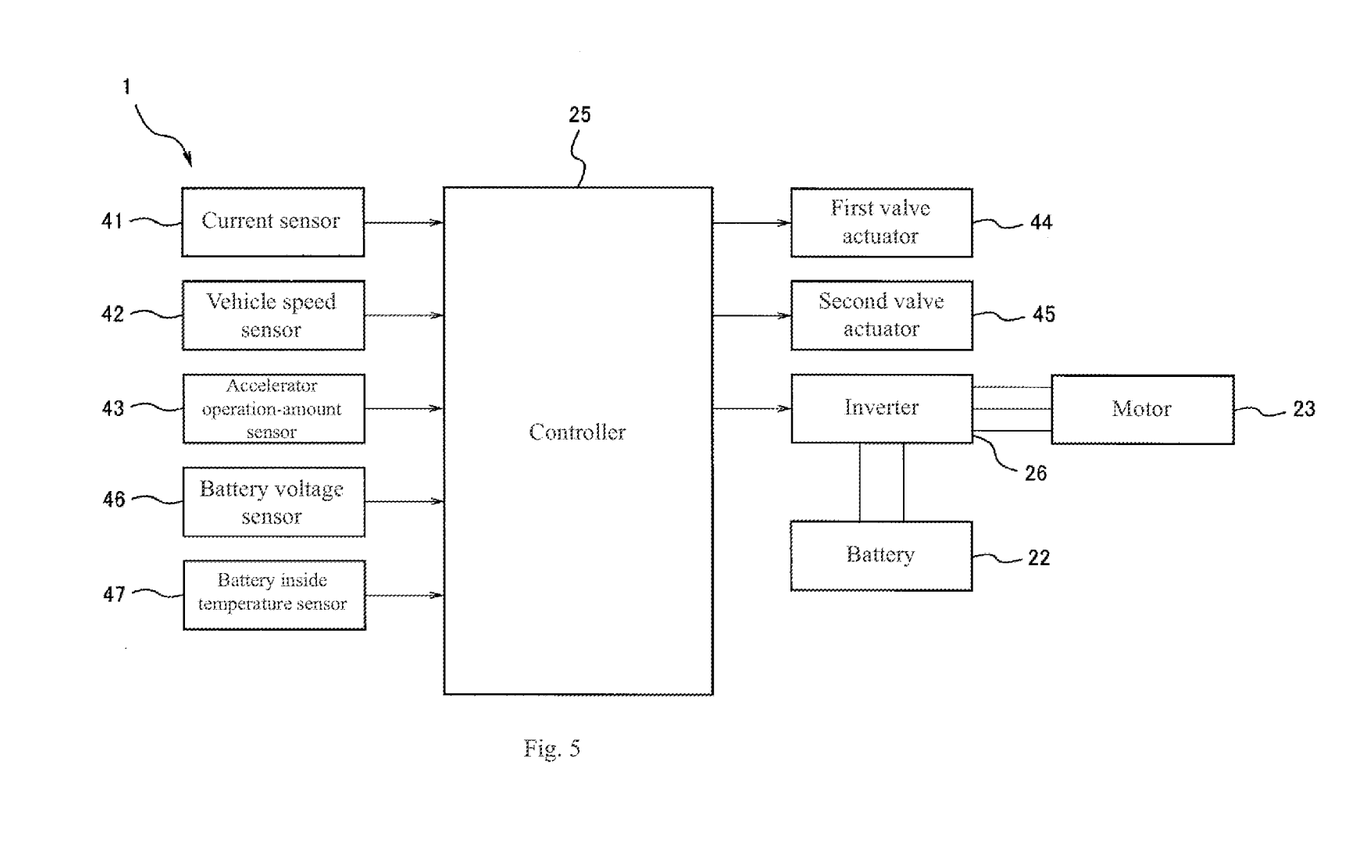
FIG. 5 is a block diagram of a control system of the electric two-wheeled vehicle shown in FIG. 1.

FIG. 5 is a block diagram of a control system of the electric two-wheeled vehicle 1 shown in FIG. 1. As shown in FIGS. 2 and 5, the controller 25 is connected to a current sensor 41 capable of detecting a value of a current flowing through the coil 33 of the motor 23, a vehicle speed sensor 42 capable of detecting traveling speed of the electric two-wheeled vehicle 1 by detecting the rotation number of the front wheel 3, an accelerator operation-amount sensor 43 capable of detecting an accelerator operation-amount that is a rotation amount of the accelerator grip 5a operated by the driver, a battery voltage sensor 46, and a battery inside temperature sensor 47, as a detector.

The controller 25 controls the inverter 26 according to the accelerator operation-amount detected by the accelerator operation-amount sensor 43, thereby controlling a current supplied from the batteries 22 to the motor 23, to adjust output of the motor 23. That is, the controller 25 is configured such that the output of the motor 23 increases with increase of the accelerator operation-amount. Thus, drive force of the rear wheel 11 increases according to a driver's acceleration demand by operation of the accelerator grip 5a. In a case where an accelerator operation-amount detected by the accelerator operation-amount sensor 43 is a predetermined value or more, the controller 25 may control the first valve actuator 44 such that an opening degree of the first valve 51 is larger compared to a case where the accelerator operation-amount detected by the accelerator operation-amount sensor 43 is less than the predetermined value. That is, when the output of the motor 23 is large, the opening degree of the first valve 51 increases, and the flow rate of traveling wind flowing in the battery case 16 and the motor case 18 increases. Accordingly, when the heat values are large, the batteries 22 and the motor 23 can be sufficiently cooled, and a temperature can be previously suitably kept before excessively increasing.

In a case where the current value detected by the current sensor 41 is the predetermined value or more, the controller 25 controls the valve actuator 44 such that an opening degree of the first valve 51 is larger compared to a case where the current value detected by the current sensor 41 is less than the predetermined value. Consequently, when the current value detected by the current sensor 41 increases, and the heat values of the batteries 22 and the motor 23 increase, the opening degree of the first valve 51 increases and the flow rate of the traveling wind flowing in the battery case 16 and the motor case 18 increases. Accordingly, when the heat values are large, the batteries 22, and the motor 23 can be sufficiently cooled, and a temperature can be previously suitably kept before excessively increasing. The battery voltage sensor 46 may be used in place of the current sensor 41.

The controller 25 may control the second valve actuator 45 according to operating statuses of the controller 25 and the inverter 26 to open/close the second valve 52. Thus, the traveling wind path 50 is formed by division into the first branch path 50b and the second branch path 50c from the common path 50a, and the branch paths 50b, 50c are provided with the valves 51, 52 respectively, thereby enabling cooling degrees by traveling wind of the respective devices arranged on the paths to be adjusted for the respective paths. Moreover, valve actuators 44, 45 are driven only when the valves 51, 52 operate, and hence power consumption can be significantly reduced compared to a case of adjusting cooling degrees by a cooling fan or the like.

In a case where traveling speed detected by the vehicle speed sensor 42 is a predetermined value or more, the controller 25 may control the first valve actuator 44 such that an opening degree of the first valve 51 is larger compared to a case where the traveling speed detected by the vehicle speed sensor 42 is less than the predetermined value. That is, it is estimated that output of the motor 23 is large when the traveling speed is large, and therefore the opening degree of the first valve 51 is increased, thereby increasing the flow rate of the traveling wind flowing in the battery case 16 and the motor case 18. Accordingly, when the heat values are large, the batteries 22, and the motor 23 can be sufficiently cooled, and a temperature can be previously suitably kept before excessively increasing.

In a case where a temperature detected by the battery inside temperature sensor 47 is a predetermined value or more, the controller 25 may control the first valve actuator 44 such that an opening degree of the first valve 51 is larger compared to a case where the temperature detected by the battery inside temperature sensor 47 is less than the predetermined value.

The aforementioned valve control by the accelerator operation-amount sensor 43, the vehicle speed sensor 42, the current sensor 41, the battery voltage sensor 46 and the battery inside temperature sensor 47 may be performed selectively or in parallel. The opening degree of the first valve 51 may be controlled to gradually continuously change according to respective detection values of the sensors 41 to 43, 46, 47, or to change in stages.

In a case where the current value detected by the current sensor 41 is the predetermined value or more, the controller 25 may control the first valve actuator 44 such that an opening degree of the first valve 51 is smaller compared to a case where the current value detected by the current sensor 41 is less than the predetermined value. For example, in a cold area where a temperature sensor (not shown) detects that ambient temperature is lower than the predetermined value (e.g., 0° C.), when the output of the motor 23 increases and the traveling speed increases, increase of the flow rate of the traveling wind flowing in the battery case 16 and the motor case 18 is suppressed, and hence the batteries 22 and the motor 23 can be prevented from being excessively cooled by traveling wind.

(Second Embodiment)

Figure 6:
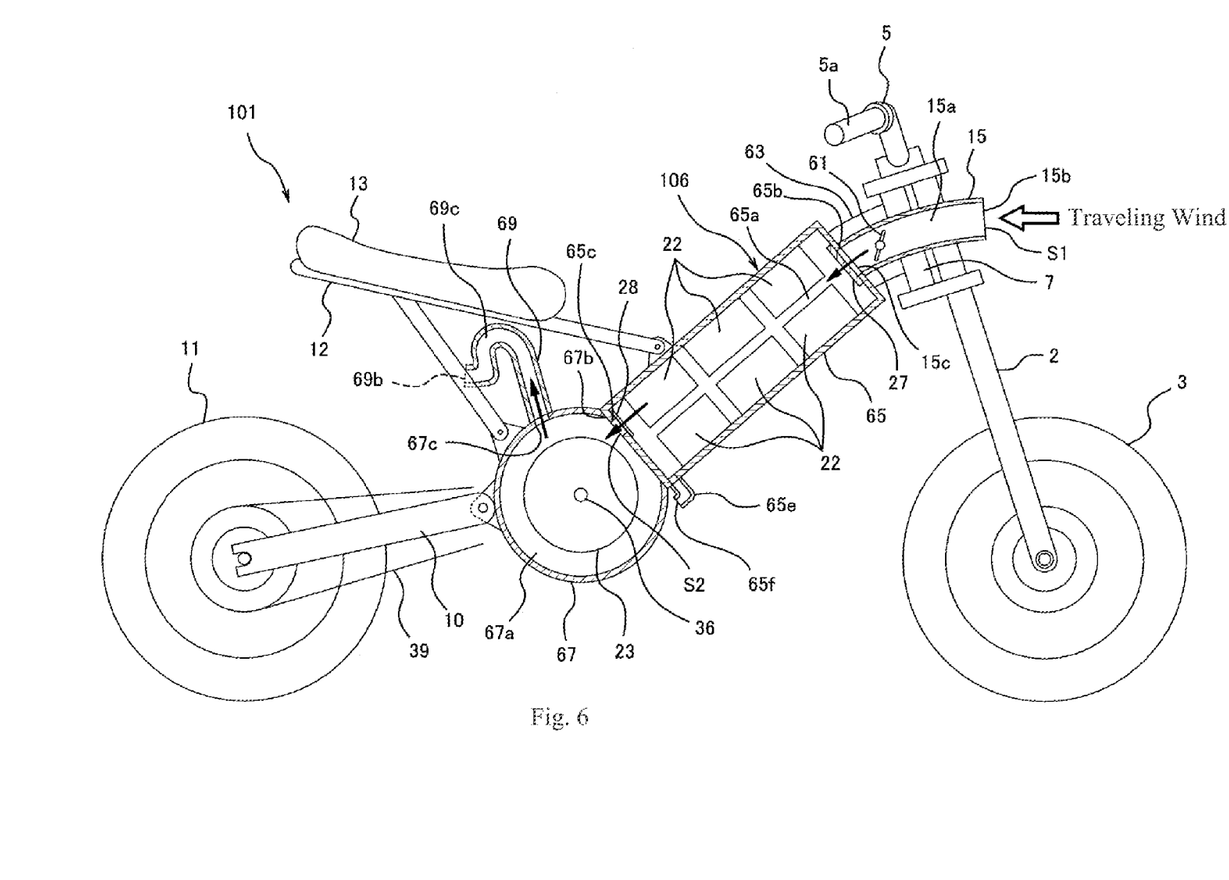
FIG. 6 is a right side view including a part of an electric two-wheeled vehicle of a second embodiment of the present invention in section.

FIG. 6 is a right side view including a part of an electric two-wheeled vehicle 101 of a second embodiment of the present invention in section. In the description, configurations in common with the first embodiment are omitted by denoting the same reference numerals. As shown in FIG. 6, in the electric two-wheeled vehicle 101 of the present embodiment, a battery case 65 and a motor case 67 double as a part of a body frame 106. Specifically, the body frame 106 includes a head pipe 7, a connecting frame 63 extending rearward from the head pipe 7, a battery case 65 having a front end portion connected to the connecting frame 63 and extending rearward while inclining downward, and a motor case 67 connected to a rear end portion of the battery case 65. That is, the battery case 65 and the motor case 67 configure a part of the body frame 106, and the battery case 65 functions like a conventional main frame. Consequently, an increase in size of a whole vehicle is suppressed compared to a case where the body frame supports the battery case and the motor case.

The battery case 65 has a substantially rectangular parallelepiped outline, and is arranged such that a longitudinal direction corresponds to a forward and rearward direction. A traveling wind outflow port 15c of a first duct 15 is communicated with a traveling wind inflow port 65b of the battery case 65. A plurality of batteries 22 are arranged with clearances therebetween in an inner space 65a of the battery case 65. Thus, the plurality of batteries 22 are arranged in the battery case 65 functioning as the main frame in a concentrative manner, and therefore mechanical cornering performance of the electric two-wheeled vehicle 101 is improved. A drain pipe 65e having a drain outlet 65f is connected to a lowermost portion in a gravity direction at a rear lower portion of the battery case 65. A traveling wind outflow port 65c is provided on a rear upper side of the battery case 65. The traveling wind outflow port 65c of the battery case 65 is communicated with a traveling wind inflow port 67b of the motor case 67. The traveling wind inflow port 67b is arranged to face an outer peripheral surface of the motor 23 accommodated in an inner space 67a of the motor case 67. An area S2 of the traveling wind inflow port 67b is set to be smaller than an area S1 of the traveling wind inlet 15b (e.g., S2 is a half of S1 or less). Consequently, wind speed in the traveling wind inflow port 67b is made larger than that in the traveling wind inlet 15b, and cooling effects can be enhanced.

A traveling wind outflow port 67c is provided on a rear side with respect to the traveling wind inflow port 67b of the motor case 67. A fifth duct 69 is communicated with the traveling wind outflow port 67c. The fifth duct 69 extends diagonally rear upward, and a traveling wind outlet 69b on its downstream end portion is arranged above the motor case 67 and below a seat 13. A valve 61 is interposed in the first duct 15. That is, the valve 61 is arranged on an upstream side with respect to the battery case 65 and the motor case 67. The valve 61 is provided to enable opening/closing of a flow path 15a of the first duct 15, and driven to enable adjustment of an opening degree by a valve actuator (not shown).

(Third Embodiment)

Figure 7:
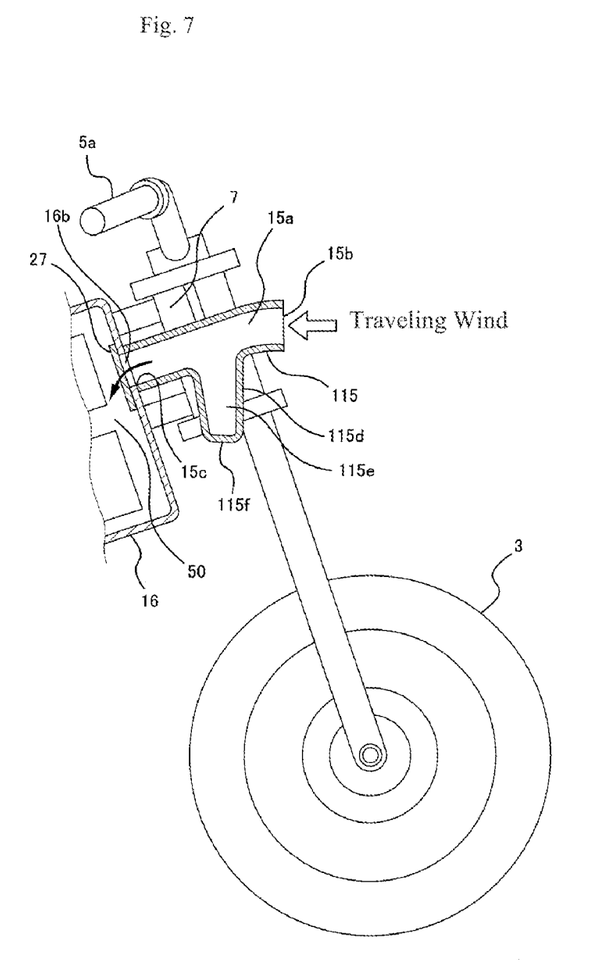
FIG. 7 is an enlarged right side view of a main portion of an electric two-wheeled vehicle of a third embodiment of the present invention.

FIG. 7 is an enlarged right side view of a main portion of an electric two-wheeled vehicle of a third embodiment of the present invention. In the description, configurations in common with the first embodiment are omitted by denoting the same reference numerals. As shown in FIG. 7, in the electric two-wheeled vehicle of the present embodiment, a first duct 115 taking in traveling wind from the front has a swelling portion 115d forming an auxiliary chamber 115e swelling below a flow path 15a in the middle of the flow path 15a extending in a forward and rearward direction thereof, and a drain hole 115f is formed on a bottom of the swelling portion 115d. That is, an area of a flow path section where the auxiliary chamber 115e exists is larger than those of a traveling wind inlet 15b and a traveling wind inflow port 16b, and is twice or more in the present embodiment. Thus, the auxiliary chamber 115e partially expanding the flow path sectional area exists, thereby reducing a flow rate of the air in the flow path 15a once and easily trapping rain or dust from outside in the auxiliary chamber 115e.

The present invention is not limited to the aforementioned respective embodiments, and configurations thereof can be modified, added or deleted without departing from the gist of the invention. The aforementioned respective embodiments may be voluntarily combined, and for example, a part of a configuration or a method in one embodiment may be applied to other embodiments.

INDUSTRIAL APPLICABILITY

As described above, the saddle-type electric vehicle according to the present invention has an excellent effect of enabling effective cooling of a motor with a simple configuration, and is useful when widely applied to motorcycles or ATVs (All Terrain Vehicles) capable of exerting significance of this effect.

DESCRIPTION OF REFERENCE CHARACTERS 1, 101 ELECTRIC TWO-WHEELED VEHICLE
6, 106 BODY FRAME
7 HEAD PIPE
8 MAIN FRAME
16, 65 BATTERY CASE
16b, 65b TRAVELING WIND INFLOW PORT
16c, 65c TRAVELING WIND OUTFLOW PORT
16f, 65f DRAIN OUTLET
18, 67 MOTOR CASE
18b, 67b TRAVELING WIND INFLOW PORT
18c, 67c TRAVELING WIND OUTFLOW PORT
22 BATTERY
23 MOTOR
24c LABYRINTH PORTION
27~29 FILTER
33 COIL
41 CURRENT SENSOR
42 VEHICLE SPEED SENSOR
43 ACCELERATOR OPERATION-AMOUNT SENSOR
44, 45 VALVE ACTUATOR
50 TRAVELING WIND PATH
51, 52 VALVE

The invention claimed is:
1. A saddle-type electric vehicle comprising:
a body frame;
a swing arm that pivots on the body frame;
a motor generating traveling power transmitted to a drive wheel;
a motor case accommodating the motor and being fixed to the body frame,
a battery supplying electric power to the motor and being fixed to the body frame; and
a battery case accommodating the battery,
wherein the motor case has a traveling wind inflow port allowing traveling wind to flow in the motor case, and a traveling wind outflow port allowing traveling wind flowing in the motor case to flow out,
a space surrounded by the motor case is communicated with a space where a coil of the motor is arranged,
the battery case has a traveling wind inflow port allowing traveling wind to flow in the battery case, and a traveling wind outflow port allowing traveling wind flowing in the battery case to flow out,
the battery case is arranged in front of the motor case, the traveling wind outflow port of the battery case communicates with the traveling wind inflow port of the motor case through a duct, and the motor case is connected to the battery case,
wherein the battery case is connected to the motor case through the duct.

2. The saddle-type electric vehicle according to claim 1, comprising:
a valve provided on a traveling wind path including the traveling wind inflow port and the traveling wind outflow port;
a valve actuator driving the valve;
a detector for detecting a parameter value associated with output of the motor; and
a controller controlling the valve actuator according to the parameter value detected by the detector.

3. The saddle-type electric vehicle according to claim 2, wherein the detector is at least one of a current sensor detecting a value of a current flowing through the coil of the motor, a vehicle speed sensor detecting vehicle traveling speed, an accelerator operation-amount sensor detecting an accelerator operation-amount by a driver, a battery voltage sensor and a battery inside temperature sensor.

4. The saddle-type electric vehicle according to claim 2, wherein in a case where the parameter value is such a value that causes an output of the motor to increase, the controller controls the valve actuator such that an opening degree of the valve becomes larger compared to a case where the parameter value is such a value that causes the output of the motor to decrease.

5. The saddle-type electric vehicle according to claim 2, wherein in a case where the parameter value is such a value that causes an output of the motor to increase, the controller controls the valve actuator such that an opening degree of the valve becomes smaller compared to a case where the parameter value is such a value that causes the output of the motor to decrease.

6. The saddle-type electric vehicle according to claim 1, the saddle-type electric vehicle being a motorcycle, comprising:
a body frame having a head pipe supporting a steering shaft, and a frame portion extending substantially rearward from the head pipe,
wherein the motor case and the battery case form a part of the frame portion,
the battery case extends such that a rear portion is located at a lower position, and
a rear end portion of the battery case is connected to a front end portion of the motor case.

7. The saddle-type electric vehicle according to claim 1, wherein a traveling wind path including the traveling wind inflow port and the traveling wind outflow port includes a filter provided on the traveling wind inflow port or an upstream region with respect to the traveling wind inflow port.

8. The saddle-type electric vehicle according to claim 1, wherein a traveling wind path including the traveling wind inflow port and the traveling wind outflow port includes a drain outlet provided on an upstream region with respect to the traveling wind inflow port, and allowing moisture attached to a wall surface forming the traveling wind path to be discharged outside by its own weight.

9. The saddle-type electric vehicle according to claim 1, wherein a traveling wind outlet discharging traveling wind flowing through a traveling wind path including the traveling wind inflow port and the traveling wind outflow port to atmosphere is arranged above the motor case and below a seat for seating.

10. The saddle-type electric vehicle according to claim 1, wherein in a traveling wind path including the traveling wind inflow port and the traveling wind outflow port, a traveling wind inlet taking in traveling wind from outside is provided upstream with respect to the traveling wind inflow port, and
an area of the traveling wind inflow port is smaller than that of the traveling wind inlet.

11. The saddle-type electric vehicle according to claim 1, wherein in a traveling wind path including the traveling wind inflow port and the traveling wind outflow port, a traveling wind inlet taking in traveling wind from outside is provided upstream with respect to the traveling wind inflow port, and
the traveling wind path is provided with an auxiliary chamber partially expanding a flow path section between the traveling wind inflow port and the traveling wind inlet.

12. The saddle-type electric vehicle according to claim 1, wherein a controller controls a valve actuator according to both of a parameter value associated with the motor and a parameter value associated with the battery.

13. The saddle-type electric vehicle according to claim 1, further comprising:
the body frame having a head pipe supporting a steering shaft, and a frame portion extending substantially rearward from the head pipe, and wherein
the battery case is fixed to the frame portion.

14. The saddle-type electric vehicle according to claim 1, wherein a rear end portion of the battery case is connected to a front end portion of the motor case.

15. A saddle-type electric vehicle, comprising:
a body frame;
a swing arm that pivots on the body frame;
a motor generating traveling power transmitted to a drive wheel;
a motor case accommodating the motor and being fixed to the body frame,
a battery supplying electric power to the motor and being fixed to the body frame; and
a battery case accommodating the battery,
wherein the motor case has a traveling wind inflow port allowing traveling wind to flow in the motor case, and a traveling wind outflow port allowing traveling wind flowing in the motor case to flow out,
a space surrounded by the motor case is communicated with a space where a coil of the motor is arranged,
the battery case has a traveling wind inflow port allowing traveling wind to flow in the battery case, and a traveling wind outflow port allowing traveling wind flowing in the battery case to flow out,
the battery case is arranged in front of the motor case,
the traveling wind outflow port of the battery case communicates with the traveling wind inflow port of the motor case through a duct, and the motor case is connected to the battery case, and
wherein the traveling wind inflow port of the battery case is located at an upper portion of the vehicle.

16. The saddle-type electric vehicle according to claim 1, further comprising:
the body frame having a head pipe supporting a steering shaft, and a frame portion extending substantially rearward from the head pipe,
wherein the traveling wind inflow port of the battery case is located in the vicinity of the head pipe.

17. A saddle-type electric vehicle comprising:
a motor generating traveling power transmitted to a drive wheel;
a motor case accommodating the motor; and
a duct connected to the motor case, wherein the motor case has a traveling wind inflow port allowing traveling wind to flow in the motor case, and a traveling wind outflow port allowing traveling wind flowing in the motor case to flow out, a space surrounded by the motor case is communicated with a space where a coil of the motor is arranged, the duct discharges the traveling wind from the traveling wind outflow port of the motor case to atmosphere and has a U-shaped portion which is convex upward.

* * * * *